(12) United States Patent
Naito et al.

(10) Patent No.: US 6,337,376 B1
(45) Date of Patent: Jan. 8, 2002

(54) METHOD FOR PRODUCING A POLYOLEFIN

(75) Inventors: Yutaka Naito, Mie-ken; Fumiharu Takahashi, Yokkaichi; Mitsuhiro Mori, Aichi-ken; Yozo Kondo, Yokkaichi, all of (JP)

(73) Assignee: Tosoh Corporation, Shinnanyo (JP)

( * ) Notice: Subject to any disclaimer, the term of this patent is extended or adjusted under 35 U.S.C. 154(b) by 0 days.

(21) Appl. No.: 08/345,343

(22) Filed: Nov. 21, 1994

Related U.S. Application Data

(63) Continuation of application No. 08/161,453, filed on Dec. 6, 1993, now abandoned, which is a continuation of application No. 07/907,633, filed on Jul. 2, 1992, now abandoned.

(30) Foreign Application Priority Data

Jul. 2, 1991 (JP) .............................................. 3-187083

(51) Int. Cl.$^7$ .................................................. C08F 4/12
(52) U.S. Cl. ............................... 526/124.1; 526/124.2; 526/128; 526/142; 526/127; 526/348; 502/103; 502/119; 502/125
(58) Field of Search ................................ 526/124, 128, 526/124.1, 124.2, 142, 127, 348; 502/103, 119, 125

(56) References Cited

U.S. PATENT DOCUMENTS

| 4,105,846 A | * | 8/1978 | Hoff et al. | 526/124 |
| 4,298,713 A | * | 11/1981 | Morita et al. | 526/904 |
| 4,410,671 A | * | 10/1983 | Welch et al. | 526/904 |
| 4,579,836 A | * | 4/1986 | Arzoumanidis et al. | 526/904 |
| 4,721,763 A | * | 1/1988 | Bailly et al. | 526/904 |
| 4,804,726 A | * | 2/1989 | Kondo et al. | 526/124 |
| 4,902,761 A | * | 2/1990 | Suga et al. | 526/124 |
| 4,985,515 A | * | 1/1991 | Matsumura et al. | 526/904 |
| 5,118,769 A | * | 6/1992 | Kondo et al. | 526/128 |
| 5,225,502 A | * | 7/1993 | Sato et al. | 526/128 |

FOREIGN PATENT DOCUMENTS

| EP | 0446 801 | | 9/1991 | |
| FR | 2 656 313 | | 6/1991 | |
| JP | 62-115004 | * | 5/1987 | 526/904 |

\* cited by examiner

Primary Examiner—David W. Wu
Assistant Examiner—Ling-Siu Choi
(74) Attorney, Agent, or Firm—Oblon, Spivak, McClelland, Maier & Neustadt, P.C.

(57) ABSTRACT

A method to prepare a polyolefin in the presence of a catalyst comprising:

(A) a solid catalyst component prepared by reacting a homogenous solution consisting of
(i) at least one member selected from the group consisting of metal magnesium and a hydroxylated organic compound, and oxygen-containing organic compounds of magnesium,
(ii) at least one oxygen-containing organic compound of titanium and
(iii) at least one silicon compound, first with
(iv) at least one first organoaluminum halide compound of the formula:

$$AlR^5_z X_{3-z}$$

wherein $R^5$ is a hydrocarbon group having from 1 to 20 carbon atoms, X is a halogen atom, and $1 \leq z \leq 2$, and wherein the atomic ratio of gram atoms of Al in the component (iv) to gram atoms of Mg in the component (i) (Al/Mg) is from 0.1 to 2.5 to precipitate crystalline nuclei, and then with
(iv') at least one second organoaluminum halide compound different from (iv) of the formula:

$$AlR^5_z X_{3-z}$$

wherein $R^5$ and X are the same as defined above, and $0<z<2$, and wherein the atomic ratio of gram atoms of Al in the component (iv') to gram atoms of Mg in the component (i) is from 0.5 to 20 to effect growth of the crystalline nuclei precipitated in (iv), adding thereto
(v) at least one member selected from the group consisting of organometallic compounds of metals of Groups Ia, IIa, IIb, IIIb, and IVb of the Periodic Table, and
(vi) absorbing at least one α-olefin in the reaction product of (i)–(v) in an amount of 0.001 to 20 parts by weight per part by weight of said reaction product of (i)–(v), and (B) an additional amount of at least one member selected from the group consisting of organometallic compounds of metals of Groups Ia, IIa, IIb, IIIb and IVb of the Periodic Table.

9 Claims, No Drawings

METHOD FOR PRODUCING A POLYOLEFIN

This application is a continuation of application Ser. No. 08/161,453, filed on Dec. 6, 1993, now abandoned, which is a continuation of application Ser. No. 07/907,633, filed Jul. 2, 1992, abandoned.

This invention relates to a method for producing a polyolefin by polymerizing at least one olefin in the presence of a novel catalyst system. More particularly, this invention relates to a method whereby a polyolefin having excellent quality can be produced in a single catalyst system at high productivity and high catalytic activity irrespective of the range of density and the method of production.

It is already known to use a catalyst system comprising a transition metal compound and an organometallic compound for low-pressure polymerization of olefins, and such system is widely employed on an industrial scale.

With respect to polyolefins obtainable by the low-pressure polymerization of olefins, it is known that by controlling the density, a wide range of polyolefins can be produced ranging from those having a relatively low density and being excellent in transparency and flexibility, for example, a linear low-density polyethylene, to those having a high density and being excellent in stiffness, for example, a high-density polyethylene and an isotactic polypropylene. For catalyst systems suitable therefore, various studies have been made from various aspects in industry and universities, and many proposals have been made.

On the other hand, as the low-pressure polymerization method using the above catalyst system, there have been known a method, such as a slurry polymerization method, which employes a solvent and thus has an advantage that removal of by-products can be done by the solvent, and a gas-phase polymerization method which employs no solvent and is advantageous from the viewpoint of energy. Industrial productivity in each polymerization method depends substantially on the quality of the resulting polyolefin and the properties of polyolefin particles. More specifically, if the bulk density, average particle size, particle size distribution, proportion of fine particles, and the like of the resulting polyolefin particles are not satisfactory, process troubles are likely to result thereby reducing the productivity. Thus, many proposals have already been made for improving the particle properties with respect to catalyst systems suitable for the respective polymerization methods.

However, conventional proposals are concerned with the technology for the combination of a specific range of density and a specific polymerization method. Therefore, to satisfy the diversification of polyolefins in the market in recent years, polyolefin producers are required to appropriately select and use suitable catalyst systems depending on the respective combinations of the range of density and the polymerization method. That is, in such conventional technology, they must have various catalyst systems to satisfy the diversification of the range of density and the diversification of the polymerization method, such being disadvantageous from the industrial viewpoint.

Under such circumstances, the present inventors have made a further study to make it possible to produce polyolefins of every range of density with a single catalyst system by an optional polymerization method.

For example, in Japanese Examined Patent Publication No. 15110/1977, the present inventors have proposed a catalyst system which exhibits quite high catalytic activities and which comprises a catalyst component (A) obtained by reacting magnesium metal and a hydroxylated organic compound, or an oxygen-containing organic compound of magnesium, an oxygen-containing organic compound of a transition metal and an aluminum halide, and a catalyst component (B) of an organometallic compound. However, when such a catalyst system is applied to a slurry polymerization method or a gas phase polymerization method, polymer particles obtained are still not satisfactory in the powder properties because the average particle size is small, the particle size distribution is broad, and the proportion of fine particles contained in the polymer particles is high.

The present inventors have previously found that the particle size of a polymer can be increased by using a silicon compound in addition to the raw materials for a catalyst component (A) disclosed in Japanese Examined Patent Publication No. 15110/1977, and filed a patent application i.e. Japanese Examined Patent Publication No. 58367/1987, but such a method has not led to an improvement in the particle size distribution.

Further, the present inventors have found that the particle size distribution can be improved by partially reducing raw materials for a catalyst component (A) disclosed in Japanese Examined Patent Publication No. 15110/1977 with an organoaluminum compound, followed by a reaction with a silicon compound and further with an aluminum halide compound, and filed a patent application i.e. Japanese Unexamined Patent Publication No. 262802/1985. However, in this method, the particle size is not sufficiently large and the catalyst particles tend to disintegrate during the step of transportation or polymerization. In addition, in a gas phase polymerization, not only the polymer tends to be fine powder, but also the catalytic activity tends to be low, whereby there still remains a room for improvement.

Under such circumstances, several solutions for improving the particle properties have been proposed. For example, in Japanese Examined Patent Publication No. 49026/1977, it is proposed to conduct a so-called prepolymerization by activating a halide of a trivalent titanium with an organoaluminum compound, followed by treatment with an olefin having from 2 to 6 carbon atoms. However, in this method, the catalytic activity is insufficient and the properties of polyolefin particles are not satisfactory.

Under such circumstances, the present inventors have conducted a gas phase polymerization by applying the technology of this prepolymerization to the catalyst as disclosed in Japanese Unexamined Patent Publication No. 262802/1985. However, as shown in Comparative Examples, both the activity and the powder properties are not satisfactory.

That is, the technique of prepolymerization is not universally effective for any optional catalyst system. In this connection, for example, Japanese Unexamined Patent Publication No. 219311/1984 discloses that when a solid state transition metal catalyst comprising, as essential components, magnesium, a transition metal and a halogen, is prepolymerized with α-olefin, the catalyst tends to be fine particles, and the polymer thereby obtained, accordingly tends to be fine powder. This publication shows that the technology of prepolymerization exhibits a specific effect to a specific catalyst.

An object of the present invention is to make it possible to produce polyolefins of various ranges of density at high productivity by a single catalyst system by an optional polymerization method. More specifically, the object is to provide a method capable of producing polyolefins ranging from a high density to a low density at high catalytic activity by the slurry polymerization method or the gas phase polymerization method, whereby excellent polyolefin particles having a high bulk density, a narrow particle size distribution and a large particle size can be produced.

The present invention have conducted extensive researches to attain the above-mentioned object, and, as a result, have found it possible to obtain a polymer excellent in powder properties such as bulk density, particle size distribution or particle size by a slurry polymerization method or a gas phase polymerization method by combining an organometallic compound and a solid catalyst component obtained by prepolymerizing at least one α-olefin to a solid composite having a specific composition. The present invention has been accomplished on the basis of this discovery.

The present invention provides a method for producing a polyolefin, which comprises polymerizing at least one α-olefin in the presence of a catalyst system comprising:

(A) a solid catalyst component prepared by prepolymerizing
  (vi) at least one α-olefin in the presence of a solid composite obtained by reacting a homogeneous solution containing
    (i) at least one member selected from the group consisting of metal magnesium and a hydroxylated organic compound, and oxygen-containing organic compounds of magnesium,
    (ii) at least one oxygen-containing organic compound of titanium and
    (iii) at least one silicon compound, with
  (iv) at least one organoaluminum halide compound, and
  (v) at least one member selected from the group consisting of organometallic compounds of metals of Groups Ia, IIa, IIb, IIIb and IVb of the Periodic Table, and
(B) at least one member selected from the group consisting of organometallic compounds of metals of Groups Ia, IIa, IIb, IIIb and IVb of the Periodic Table.

Now, the present invention will be described in detail with reference to the preferred embodiments.

Metal magnesium and a hydroxylated organic compound, and oxygen-containing organic compounds of magnesium that are used as reactant (i) in the present invention will be described below.

Firstly, when metal magnesium and a hydroxylated organic compound are used, metal magnesium can take any form such as powdery form, granular form, foil form, or ribbon form, and as the hydroxylated organic compound, alcohols, organosilanols, and phenols are suitable.

As the alcohols, linear or branched aliphatic alcohols, alicyclic alcohols, aromatic alcohols having 1 to 18 carbon atoms can be used. Specific examples include methanol, ethanol, n-propanol, i-propanol, n-butanol, i-butanol, n-hexanol, 2-ethylhexanol, n-octanol, i-octanol, n-stearyl alcohol, cyclopentanol, cyclohexanol, and ethylene glycol.

The organosilanols are those having at least one hydroxyl group and an organic group selected from an alkyl group, a cycloalkyl group, an arylalkyl group, an aryl group, and an alkylaryl group with 1 to 12, preferably 1 to 6, carbon atoms. For example, trimethylsilanol, triethylsilanol, triphenylsilanol, and t-butyldimethylsilanol may be mentioned.

As phenols, phenol, cresol, xylenol, and hydroquinone may be mentioned.

These hydroxylated organic compounds can be used alone or as a mixture of two or more of them. They may be, of course, used alone, but, when they are used as a mixture of two or more of them, such a mixture may sometimes present a unique effect to powder properties or the like of a polymer.

In addition, when metal magnesium is used to prepare a solid catalyst composite of the present invention, for the purpose of accelerating the reaction, it is preferable to add one or more substances that will react or form an adduct, with metal magnesium, e.g. polar substances such as iodine, mercuric chloride, halogenated alkyls, organic acid esters, and organic acids.

As compounds belonging to the oxygen-containing organic compounds of magnesium, the following compounds may, for example, be mentioned: magnesium alkoxides such as magnesium methylate, magnesium ethylate, magnesium isopropylate, magnesium decanolate, magnesium methoxyethylate and magnesium cyclohexanolate, magnesium alkylalkoxides such as magnesium ethylethylate, magnesium hydroalkoxides such as magnesium hydroxymethylate, magnesium phenoxides such as magnesium phenate, magnesium naphthenate, magnesium phenanthlenate and magnesium cresolate, magnesium carboxylates such as magnesium acetate, magnesium stearate, magnesium benzoate, magnesium phenylacetate, magnesium adipate, magnesium sebacate, magnesium phthalate, magnesium acrylate and magnesium oleate, magnesium oxymates such as magnesium butyloxymates, magnesium dimethylglyoxymates and magnesium cyclohexyloxymate, magnesium hydroxamate salts, magnesium hydroxylamine salts such as N-nitroso-N-phenyl-hydroxylamine derivatives, magnesium enolates such as magnesium acetylacetonate, magnesium silanolates such as magnesium triphenyl silanolate, and complex alkoxides of magnesium and other metals, such as, $Mg[Al(OC_2H_5)_4]_2$. These oxygen-containing organic magnesium compounds are used alone or as a mixture of two or more of them.

As the oxygen-containing organic compound of titanium for the above-mentioned reactant (ii), a compound represented by the general formula $[TiO_a(OR^1)_b]_m$ is used, in which $R^1$ represents a hydrocarbon group such as a linear or branched alkyl group, a cycloalkyl group, an arylalkyl group, an aryl group, and an alkylaryl group, having 1 to 20, preferably 1 to 10, carbon atoms, a and b are such that $a \geq 0$ and $b > 0$ and they are numbers agreeable with the valence of titanium, and m is an integer. It is particularly preferred to use an oxygen-containing organic compound in which a is $0 \leq a \leq 1$ and m is $1 \leq m \leq 6$.

As specific examples, titanium tetraethoxide, titanium tetra-n-propoxide, titanium tetra-i-propoxide, titanium tetra-n-butoxide and hexa-i-propoxy dititanate may be mentioned. Use of an oxygen-containing organic compound having different hydrocarbon groups falls within the scope of the present invention. These oxygen-containing organic compounds are used alone or as a mixture of two or more of them.

As the silicon compound for the reactant (iii), the following polysiloxanes and silanes may be used.

As polysiloxanes, siloxane polymers of a linear, cyclic or three-dimensional structure may be mentioned which have repeating units of one or more types of the general formula:

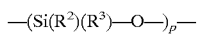

wherein $R^2$ and $R^3$ may be the same or different and each represents an atom or a residual group that can bond to the silicon, for example, a hydrocarbon group such as an alkyl group or an aryl group, having from 1 to 12 carbon atoms, hydrogen, a halogen, or an alkoxy group, an aryloxy group or a fatty acid residue, having from 1 to 12 carbon atoms, and p is usually an integer of from 2 to 10,000, in various proportions and distributions in the molecule, except for the case where $R^2$ and $R^3$ are all hydrogen or halogen.

Specifically, the linear polysiloxanes may, for example, be hexamethyldisiloxane, octamethyltrisiloxane, dimethylpolysiloxane, diethylpolysiloxane, methylethylpolysiloxane, methylhydropolysiloxane, ethylhydropolysiloxane, butylhydropolysiloxane, hexaphenyldisiloxane, octaphenyltrisiloxane, diphenylpolysiloxane, phenylhydropolysiloxane, methylphenylpolysiloxane, 1,5-dichlorohexamethyltrisiloxane, 1,7-dichlorooctamethyltetrasiloxane, dimethoxypolysiloxane, diethoxypolysiloxane, and diphenoxypolysiloxane.

The cyclic polysiloxanes may, for example, be hexamethylcyclotrisiloxane, octamethylcyclotetrasiloxane, decamethylcyclopentasiloxane, 2,4,6-trimethylcyclotrisiloxane, 2,4,6,8-tetramethylcyclotetrasiloxane, triphenyltrimethylcyclotrisiloxane, tetraphenyltetramethylcyclotetrasiloxane, hexaphenylcyclotrisiloxane, and octaphenylcyclotetrasiloxane.

The polysiloxanes having a three-dimensional structure may, for example, be those obtained by heating the above linear or cyclic polysiloxanes to let them have a crosslinked structure.

These polysiloxanes are preferably liquid for the convenience in handling, and it is desirable that they have a viscosity within a range of from 1 to 10,000 centistokes, preferably from 1 to 1,000 centistokes, at 25° C. However, they are not necessarily limited to liquid polysiloxanes, and they may be solid that are generally called silicon grease.

The silanes may, for example, be compounds represented by the general formula $H_qSi_rR^4_sX_t$ wherein $R^4$ represents a group that can bond to the silicon, for example, a hydrocarbon group such as an alkyl group or an aryl group, having from 1 to 12 carbon atoms, or an alkoxy group, an aryloxy group or a fatty acid residue, having from 1 to 12 carbon atoms, and the plurality of $R^4$ may be the same or different; the plurality of X may be the same or different and each represents a halogen; each of q, s and t is an integer of 0 or more, r is a natural number, and $q+s+t=2r+2$ or $2r$.

Specifically, they include, for example, silanhydrocarbons such as trimethylphenylsilane, dimethyldiphenyldisilane and allyltrimethylsilane, linear and cyclic organic silanes such as hexamethyldisilane and octaphenylcyclotetrasilane, organic silanes such as methylsilane, dimethylsilane and trimethylsilane, silicon halides such as silicon tetrachloride and silicon tetrabromide, alkyl and aryl halogenosilanes such as dimethyldichlorosilane, diethyldichlorosilane, n-butyltrichlorosilane, diphenyldichlorosilane, triethylfluorosilane and dimethyldibromosilane, alkoxysilanes such as trimethylmethoxysilane, dimethyldiethoxysilane, methyltrimethoxysilane, tetramethoxysilane, tetraethoxysilane, diphenyldiethoxysilane, tetramethyldiethoxydisilane and dimethyltetraethoxydisilane, haloalkoxysilanes and halophenoxysilanes such as dichlorodiethoxysilane, dichlorodiphenylsilane and tribromoethoxysilane and silane compounds containing a fatty acid residue such as trimethylacetoxysilane, diethyldiacetoxysilane and ethyltriacetoxysilane.

Preferred are linear polysiloxanes such as dimethylpolysiloxane and methylhydropolysiloxane, and alkoxysilanes such as methyltrimethoxysilane, tetramethoxysilane and tetraethoxysilane.

The above organosilicon compounds may be used alone or two or more of them may be mixed or reacted for use.

As the organoaluminum halide compound for the reactant (iv), those represented by the general formula $AlR^5_zX_{3-z}$ may be used. In the formula, $R^5$ represents a hydrocarbon group having from 1 to 20, preferably 1 to 8, carbon atoms, X represents a halogen atom, and z is such a number that $0<z<3$, preferably $0<z\leq 2$. $R^5$ is preferably selected from a linear or branched alkyl group, a cycloalkyl group, an arylalkyl group, an aryl group and an alkylaryl group.

Specific examples of the organoaluminum halide compound include dimethylaluminum chloride, diethylaluminum chloride, diethylaluminum bromide, dipropylaluminum chloride, ethylaluminum dichloride, i-butylaluminum dichoride, methylaluminum sesquichloride, ethylaluminum sesquichloride, i-butylaluminum sesquichloride, and a mixture of triethylaluminum and aluminum trichloride.

The above organoaluminum halide compounds may be used alone or as a mixture of two or more of them. It is preferred to use a mixture of two or more of them for good powder properties.

When the solid catalyst of the present invention is prepared, the order of reacting the reactants (i), (ii) and (iii) may be any desired order so long as the chemical reactions can be carried out. For example, there may be mentioned a method wherein a silicon compound is added to a mixture of a magnesium compound and a titanium compound, a method wherein a magnesium compound, a titanium compound and a silicon compound are mixed at the same time, a method wherein a titanium compound is added to a magnesium compound and a silicon compound. A homogeneous Mg—Ti solution containing a silicon compound can be obtained by such method.

Then, a solid composite to be used in the present invention can be obtained by adding the reactant (iv) to this Mg—Ti solution.

These reactions are preferably conducted in a liquid medium. Therefore, when these reactants are not liquid by themselves under the operating conditions, or when the amount of liquid reactants is not sufficient, the reaction should be conducted in the presence of an inert organic solvent. As such an inert organic solvent, any solvent which is commonly used in this technical field may be employed. As the solvent, an aliphatic, alicyclic or aromatic hydrocarbon or a halogen derivative thereof, or a mixture thereof may be mentioned. For example, isobutane, hexane, heptane, cyclohexane, benzene, toluene, xylene or monochlorobenzene may be preferably used.

The amounts of the reactants to be used in this invention are not particularly limited, but the atomic ratio of the gram atom of Mg in the magnesium compound of the above (i) to the gram atom of Ti in the titanium compound of the above (ii), is usually $1/20\leq Mg/Ti\leq 100$, preferably $1/5\leq Mg/Ti\leq 10$. If the ratio is outside this range and Mg/Ti is too large, it tends to be difficult to obtain a homogeneous Mg—Ti solution at the time of preparation of the catalyst, or the activity of the catalyst tends to be low at the time of polymerization. If the ratio is inversely too small, problems may arise such that the catalytic activity tends to be low and the product is colored.

It is preferred to select the amounts so that the atomic ratio of the gram atom of Si in the silicon compound of the above (iii) to the gram atom of Mg in the magnesium compound of the above (i), will be usually $1/20\leq Mg/Si\leq 100$, preferably $1/10\leq Mg/Si\leq 10$. If the ratio is outside this range and Mg/Si is too large, the improvement of powder properties will sometimes be insufficient. If the ratio is inversely too small, the catalytic activity tends to be low. In the present invention, the type and amount of the organoaluminum halide of the above (iv) are properly selected, and when a solid composite is to be precipitated in the homogeneous Mg—Ti solution, it is common to appropriately control formation of crystalline nuclei, especially at the initial stage of the reaction. The reaction of the Mg—Ti solution and the reactant (iv) may be conducted in one step, but particularly preferably in two separate steps. That is, when the reaction is separated in two steps, precipitation of the crystalline nuclei is conducted in the first step, and growth of the crystalline nuclei precipitated in the first step, is conducted in the second step. Thus, it is required to select the types and amounts of the reactants (iv) to be used in the first and second steps so that they would be suitable to the respective steps. More specifically, it is preferred that, in the reaction of the first step, z of $R^5_z AlX_{3-z}$ is $1 \leq z \leq 2$, and its amount (molar ratio) to Mg is from 0.1 to 2.5, and in the reaction of the second step, they are $0<z<2$ and from 0.5 to 20, respectively.

The reaction conditions in each step are not particularly limited, and the reaction is carried out usually at the temperature within the range of from −50 to 300° C., preferably from 0 to 200° C., for 0.5 to 50 hours, preferably for 1 to 6 hours, in an inert gas atmosphere under an ordinary pressure or an elevated pressure.

The solid composite thus obtained may be separated from remaining unreacted substances and by-products by filtration or decantation, or may not be separated therefrom. Then, the solid composite is suspended in an inert organic solvent and subjected to prepolymerization. Prepolymerization is conducted by contacting an α-olefin to the solid composite in the presence of the organometallic compound at the temperature of not higher than 100° C. As the α-olefin to be prepolymerized to the solid composite, ethylene, propylene, 1-butene, 1-pentene, 3-methyl-1-pentene, 2-methyl-1-pentene, 4-methyl-1-pentene or 1-octene may be mentioned. These α-olefins may be used alone or as a mixture of two or more of them for the prepolymerization to the solid composite.

As the organometallic compounds of Groups Ia, IIa, IIb, IIIb and IVb of the Periodic Table for the above (v), there may be mentioned organometallic compounds comprising a metal such as lithium, magnesium, zinc, tin or aluminum, and an organic group.

As the organic group, an alkyl group may be mentioned as a typical example. As the alkyl group, a linear or branched alkyl group having 1 to 20 carbon atoms may be used. Specifically, n-butyllithium, diethylmagnesium, diethylzinc, trimethylaluminum, triethylaluminum, tri-i-butylaluminum, tri-n-butylaluminum, tri-n-decylaluminum, tetraethyltin or tetrabutyltin, may be mentioned.

It is particularly preferred to use a trialkylaluminum having a linear or branched alkyl group having from 1 to 10 carbon atoms.

In addition, an alkyl metal hydride having an alkyl group having from 1 to 20 carbon atoms may be used as the organometallic compound. As such a compound, there may be specifically mentioned diisobutylaluminum hydride or trimethyltin hydride. There may also be used an alkyl metal halide having an alkyl group having from 1 to 20 carbon atoms such as ethylaluminum sesquichloride, diethylaluminum chloride or diisobutylaluminum chloride, and an alkyl metal alkoxide such as diethylaluminum ethoxide.

There may also be used an organoaluminum compound obtained by the reaction of a trialkylaluminum or dialkylaluminum hydride having an alkyl group having from 1 to 20 carbon atoms with a diolefin having from 4 to 20 carbon atoms, such as isoprenylaluminum.

The above organometallic compounds may be used alone, or two or more of them may be mixed or reacted for use. Further, an electron donative compound may be used for the purpose of controlling the molecular weight and stereospecificity.

When the electron donative compound is to be used, it is proper to use as such compound, an organic acid ester, an oxygen-containing organic compound of silicon, or a nitrogen-containing organic compound. Specifically, ethylbenzoate, ethyltoluylate, tetraethoxysilane, diphenyldimethoxysilane and diphenylamine may be mentioned.

The total amount of the α-olefin to be used for the prepolymerization is preferably within the range of from 0.001 to 20 parts by weight, particularly preferably from 0.01 to 10 parts by weight, per part by weight of the solid composite. If the absorbed amount of α-olefin is too small, the particle size of the catalyst tends to be insufficient, and if the absorbed amount is too large, the solid composite particles sometimes adhere to one another. This contacting treatment may be conducted in a gas phase or without a solvent, or may be conducted in the presence of an inert organic solvent. When the treatment is conducted in the presence of the inert organic solvent, said organic solvent may be the same as the one used for the preparation of the solid composite.

The contacting conditions are not particularly limited, but it is required to conduct the contacting under the conditions substantially free from oxygen and moisture. In general, this contacting treatment may be carried out within a temperature range of from −50 to 100° C., preferably from 0 to 50° C., under an ordinary pressure or an elevated pressure. It is preferred to carry out the contact sufficiently under a flowing state when the treatment is conducted in a gas phase, or under stirring when the treatment is conducted in a liquid phase.

The amount of the solid composite to be used is not particularly limited, but it may preferably be used in an amount of from 0.1 to 500 g per liter of the solvent or per liter of the reactor. The amount of the organometallic compound to be used is selected from the range of from 0.1 to 200 mol per mol of Ti of the solid composite, and when the electron donative compound is used, the amount is selected from the range of from 0.1 to 10 mol per mol of the organometallic compound.

After the prepolymerization, the resulting catalyst component may be washed with an inert organic solvent, or such washing may be omitted.

The catalyst component (A) thus obtained may be used as such in the suspended condition for polymerization, but as the case requires, it may be separated from the solvent, or it may be dried by heating under an ordinary pressure or a reduced pressure to remove the solvent and used in such a dried state.

In the present invention, the organometallic compound for the catalyst component (B) may be the same as the organic compound of the above (v).

The polymerization of olefins according to the present invention can be carried out under usual reaction conditions of a so-called Ziegler process. That is, polymerization can be conducted at a temperature of from 20 to 110° C. by a continuous system or a batch system. The polymerization pressure is not particularly limited, but it is suitable to employ an elevated pressure, particularly from 1.5 to 50 kg/cm² G. When the polymerization is carried out in the presence of an inert solvent, as the inert solvent, any one usually employed can be used. Particularly, it is proper to use an alkane or cycloalkane having from 4 to 20 carbon atoms, for example, isobutane, pentane, hexane or cyclohexane.

When the polymerization is carried out in a gas phase, the reactor to be used for the polymerization steps may be of any type which is commonly used in this technical field, for example, a fluidized bed reactor or a stirring tank type reactor. When the fluidized bed reactor is used, the reaction is conducted by blowing an olefin in the gas state and/or an inert gas into the reaction system, thereby maintaining the reaction system in the state of fluid. As a stirrer when the stirring tank type reactor is used, various type of stirrers can be employed, for example, an anchor type stirrer, a screw type stirrer, a ribbon type stirrer and the like.

The polymerization of the present invention includes not only homopolymerization of an α-olefin but also copolymerization of two or more α-olefins. As the α-olefin to be used for the polymerization, ethylene, propylene, 1-butene, 1-pentene, 1-hexene, 1-octene or 4-methyl-1-pentene, may, for example, be mentioned. Also, copolymerization can be conducted by using a mixture of an α-olefin and a diene such as butadiene or isoprene to introduce double bond into the polymer. It is necessary to select the amount of the α-olefin to be used for the copolymerization depending on the desired density of an objective polymer. It is possible to produce the polymer of the present invention within a density range of from 0.890 to 0.970 g/cm$^3$.

The polymerization operation of the present invention can be carried out by not only one stage polymerization which is conducted under a common single polymerization condition, but also multistage polymerization which is conducted under plural polymerization conditions.

In the practice of the present invention, the catalyst component (A) is used preferably in an amount of from 0.001 to 2.5 mmol in terms of titanium atom per liter of the solvent or per liter of the inner volume of the reactor, and depending on the conditions, a higher concentration may be used.

The organoaluminum of the catalyst component (B) is used at a concentration of from 0.02 to 50 mmol, preferably from 0.2 to 5 mmol, per liter of the solvent or per liter of the internal volume of the reactor.

In the present invention, the molecular weight of the produced polymer can be controlled by a conventional means, e.g. a method in which an appropriate amount of hydrogen is present in the reaction system.

A first effect of the present invention resides in that it is possible to produce polyolefins having various ranges of density at high productivity by a single catalyst system by an optional polymerization method. That is, according to the present invention, it is possible to obtain polyolefins ranging from a high density to a low density by a slurry polymerization method or a gas phase polymerization method with a high catalytic activity, and a further to obtain polyolefin particles having excellent properties such as high bulk density, a narrow particle size distribution and a large particle size. Thus, in the polymerization step, formation of substances adhering to the polymerization apparatus can be inhibited. Further, in the transportation step, no bridge will be formed in the silo, and troubles involved in the transportation can be eliminated. Further, granulation can be conducted very smoothly. If the particle size distribution of a polymer is narrow, classification of particles hardly arises and uniform particles can be obtained, particularly in the case of producing a polymer having a wider molecular weight distribution by a multi-stage polymerization method, whereby hard spots or unevenness will not be formed in the product.

The second effect of the present invention is that the catalytic activity is high without impairing powder properties i.e. the weight of a polymer obtainable per unit weight of the catalyst component (A) is remarkably large. Thus, it is not necessary to take a special measure, to remove a catalyst residue from the polymer, and it is possible to avoid problems such as deterioration and coloring of the polymer at the time of molding.

Now, the present invention will be described in further detail with reference to Examples. However, it should be understood that the present invention is by no means restricted by such specific Examples. In the Examples and Comparative Examples, HLMI/MI stands for the ratio of the high-load melt index (HLMI; measured under the condition F of ASTMD-1238) to the melt index (MI; measured under the condition E of ASTMD-1238), and is an index for the molecular weight distribution. If the HLMI/MI value is small, the molecular weight distribution is considered to be small.

The activity shows the amount (g) of a polymer produced per gram of the solid catalyst component (A). With respect to the width of the particle size distribution of the polymer particles, the results of the classification of the polymer particles by sieves are plotted on a probability logarithmic paper to find the geometric standard deviation from the approximated straight line in known manner, and the width is expressed in terms of its common logarithm (hereinafter referred to as σ). The average particle size is a value obtained by reading the particle size corresponding to the weight accumulated value 50% of the above approximated line.

EXAMPLE 1

(a) Preparation of Solid Composite 7.0 g (0.288 mol) of metal magnesium powder and 49.0 g (0.144 mol) of titanium tetrabutoxide were placed in a 1 l flask equipped with a stirrer, and then 44.8 g (0.60 mol) of n-butanol in which 0.35 g of iodine was dissolved, was added at 90° C. over 2 hours. Then, the mixture was stirred at 140° C. for 2 hours under sealing with nitrogen while removing the evolved hydrogen gas. After cooling the mixture to 110° C., 18 g (0.086 mol) of tetraethoxysilane and 13.2 g (0.086 mol) of tetramethoxysilane were added, and then the mixture was further stirred at 140° C. for 2 hours. Then, 490 ml of hexane was added thereto, to obtain a Mg—Ti solution.

This Mg—Ti solution was placed in a 500 ml flask in an amount of 96.8 g (0.058 mol in terms of Mg), and then 63 ml of a hexane solution containing 0.17 mol of i-butylaluminum dichloride was added, and stirring was conducted at 70° C. for 1 hour. Hexane was added to the product, and washing was conducted 7 times by decantation, to obtain a slurry of a solid composite suspended in hexane. A part thereof was collected, had the supernatant removed, dried under nitrogen atmosphere, and then analyzed by an elemental analysis, whereby Ti was 11.1% by weight.

(b) Preparation of Catalyst Component (A)

The internal atmosphere of an electromagnetic stirring type autoclave made of stainless steel having an internal volume of 2 l was replaced thoroughly with nitrogen, a suspension of 3.24 g of the above solid composite in 400 ml of hexane was charged thereinto. Thereafter, 8.56 g (75.0 mmol) of triethylaluminum as the catalyst component (V) was added. Then, while maintaining the internal temperature of the autoclave at 30° C. and the internal pressure at from 1 to 2 kg/cm$^2$ G, ethylene was supplied to react 28.5 g of ethylene, for prepolymerization of the solid composite with ethylene. By this operation, 10.0 g of ethylene was absorbed per gram of the solid composite (hereinafter, the absorbed amount of an olefin per the solid composite (g/g) is referred to as an absorption ratio). Hexane was added to the product, and washing was conducted 7 times by decantation. Thus, a catalyst component (A) suspended in hexane was obtained.

(c) Polymerization of Ethylene

The internal atmosphere of an electromagnetic stirring type autoclave made of stainless steel having an internal volume of 2 l was replaced thoroughly with nitrogen, 1.2 l of hexane was charged thereinto, and the internal temperature was adjusted to 80° C. Thereafter, 0.23 g (1.2 mmol) of tri-i-butylaluminum as the catalyst component (B) and the slurry obtained above containing 78.1 mg of the catalyst component (A) (contains 7.1 mg of the solid composite) were successively added. After the internal pressure of the autoclave was adjusted to 1 kg/cm$^2$ G with nitrogen, 4 kg/cm$^2$ of hydrogen was added. While ethylene was continuously added so that the internal pressure of the autoclave would be 11.0 kg/cm$^2$ G, the polymerization was carried out for 1.5 hours. After completion of the polymerization, the reactor was cooled, the unreacted gas was purged, and the polyethylene was taken out and separated from the solvent by filtration, followed by drying.

As a result, 273 g of polyethylene having a melt index of 0.8 g/10 min, an HLMI/MI of 34 and a bulk density of 0.46 g/cm$^3$ was obtained. The produced amount per gram of the solid composite (hereinafter, referred to as catalytic activity) corresponded to 38400 g/g catalyst. The average particle size was 400 µm, the proportion of fine particles having a particle size of 105 µm or less (hereinafter referred to as fine particle content) was 0.6% by weight, and σ was 0.15.

EXAMPLE 2

Polymerization of ethylene was carried out by using the catalyst component (A) prepared in Example 1 according to a gas-phase method. That is, the internal atmosphere of an electromagnetic stirring type autoclave made of stainless steel having an internal volume of 2 l was replaced thoroughly with nitrogen, 200 g of sodium chloride which was dried at 200° C. for 30 hours, was introduced as a dispersion medium, and the internal temperature was controlled at 80° C. Then, 0.19 g (0.9 mmol) of triisobutylaluminum as the catalyst component (B) and 71.5 mg of the catalyst component (A) obtained in Example 1 (containing 6.5 mg of the solid composite) were successively added. After the internal pressure of the polymerization reactor was adjusted to 1 kg/cm$^2$ G with nitrogen, 6.0 kg/cm$^2$ of hydrogen was added, and while ethylene was continuously added so that the internal pressure of the autoclave would be 21.0 kg/cm$^2$ G, the polymerization was carried out for 1.5 hours. After completion of the polymerization, the mixture was cooled, the unreacted gas was purged, and the mixture of the produced polymer and the sodium chloride was taken out. The mixture was washed with pure water to dissolve the sodium chloride and then dried to obtain the polymer.

As a result, 222 g of polyethylene having a melt index of 0.2 g/10 min, an HLMI/MI of 30, a bulk density of 0.48 g/cm$^3$ was obtained. The catalytic activity corresponded to 34,200 g/g catalyst, the average particle size was 660 µm, the content of fine particles was 0.1% by weight, and σ was 0.12.

EXAMPLE 3

(a) Preparation of Solid Composite 94.2 g of a Mg—Ti solution prepared in Example 1 (0.057 mol in terms of Mg) was placed in a separate 500 ml flask, 67 ml of a hexane solution containing 0.07 mol of diethylaluminum chloride and 0.023 mol of i-butylaluminium dichloride, was added at 45° C., and stirring was conducted for 1 hour. Then, 61 ml of a hexane solution containing 0.17 mol of i-butylaluminium dichloride was added, and stirring was conducted at 70° C. for 1 hour. Hexane was added to the product, and washing was conducted 7 times by decantation, to obtain a slurry of a solid composite suspended in hexane. A part thereof was collected, had the supernatant removed, dried under nitrogen atmosphere, and then analyzed by an elemental analysis, whereby Ti was 12.6% by weight.

(b) Preparation of Catalyst Component (A)

The internal atmosphere of an electromagnetic stirring type autoclave made of stainless steel having an internal volume of 2 l was replaced thoroughly with nitrogen, a suspension of 2.75 g of the above solid composite, in 400 ml of hexane, was charged thereinto. Then, 0.52 g (2.17 mmol) of diphenyl dimethoxysilane as an electron donative substance was added, and 8.25 g (72.3 mmol) of triethylaluminum as the catalyst component (B) was successively added. Thereafter, while maintaining the internal temperature of the autoclave at 30° C. and the pressure at 1 to 2 kg/cm$^2$ G, propylene was supplied, and 27.5 g of propylene was reacted, for prepolymerization of the solid composite with propylene. By this operation, 10.0 g of propylene was absorbed per gram of the solid composite, to obtain a catalyst component (A) suspended in hexane.

(c) Polymerization of Ethylene

Slurry polymerization of ethylene was carried out in the same manner as in Example 1. That is, polymerization was carried out at 80° C. by using 0.23 g (1.2 mmol) of tri-i-butylaluminum as the catalyst component (B) and 66 mg of the catalyst component (A) obtained above (containing 6.0 mg of the solid composite).

As a result, 265 g of polyethylene having a melt index of 0.7 g/10 min, a HLMI/MI of 30, and a bulk density of 0.48 g/cm$^3$ was obtained. The catalytic activity per gram of the solid composite corresponded to 44,200 g/g catalyst. The average particle size was 460 µm, the content of fine particles was 0.3% by weight, and σ was 0.12.

EXAMPLE 4

Gas phase polymerization of ethylene was carried out in the same manner as in Example 2 by using the catalyst component (A) prepared in Example 3. That is, polymerization was conducted at 80° C. by using 0.23 g (1.2 mmol) of tri-i-butylaluminium as the catalyst component (B) and 83.6 mg of the catalyst component (A) obtained above (containing 7.6 mg of the solid composite).

As a result, 288 g of polyethylene having a melt index of 0.3 g/10 min, a HLMI/MI of 36, and a bulk density of 0.52 g/cm$^3$ was obtained. The catalytic activity corresponded to 37,900 g/g catalyst, the average particle size was 550 µm, the content of fine particles was 0.8% by weight, and σ was 0.14.

EXAMPLE 5

Copolymerization of ethylene and 1-butene was carried out by a gas phase method by using the catalyst component (A) prepared in Example 3. That is, the internal atmosphere of an electromagnetic stirring type autoclave made of stainless steel having an internal volume of 2 l was replaced thoroughly with nitrogen, 200 g of sodium chloride which was dried at 200° C. for 30 hours, was introduced as a dispersion medium, and the internal temperature was adjusted to 80° C. Then, 0.25 g (1.26 mmol) of triisobutylaluminum as the component (B) and 95.7 mg of the catalyst component (A) obtained in Example 1 (containing 8.7 mg of a solid composite) were successively added. After the internal pressure of the polymerization reactor was adjusted to 1 kg/cm$^2$G with nitrogen, 2.0 kg/cm$^2$ of hydrogen was added, and while ethylene and 1-butene were continuously added so that buene-1/ethylene (molar ratio) in the gas phase would be 0.35 and the internal pressure of the autoclave would be 19.0 kg/cm$^2$ G, the polymerization was carried out for 1.5 hours. After completion of the polymerization, the mixture was cooled, the unreacted gas was purged, and a mixture of the produced polymer and the sodium chloride was taken out. The mixture was washed with pure water to dissolve the sodium chloride and then dried to obtain the polymer.

As a result, 338 g of polyethylene having a melt index of 0.1 g/10 min, a HLMI/MI of 32, and a bulk density of 0.50 g/cm$^3$ was obtained. The catalytic activity corresponded to 38,900 g/g catalyst, the average particle size was 460 μm, the content of fine particles was 0.5% by weight, and σ was 0.12. In addition, the density was 0.923 g/cm$^3$.

COMPARATIVE EXAMPLE 1

Gas phase polymerization of ethylene was carried out in the same manner as in Example 2 by using 11.0 mg of the solid composite prepared in (a) of Example 3 instead of the catalyst component (A).

As a result, 20 g of polyethylene having a melt index of 0.2 g/10 min, a HLMI/MI of 35 and a bulk density of 0.12 g/cm$^3$ was obtained, the catalytic activity corresponded to 1,800 g/g catalyst, the average particle size was 300 μm, the content of fine particles was 17.2% by weight, and σ was 0.41.

COMPARATIVE EXAMPLE 2

Copolymerization of ethylene and 1-butene was carried out in the same manner as in Example 5 by using 10.5 mg of the solid composite prepared in (a) of Example 3 instead of the solid component (A). As a result, 28 g of polyethylene having a melt index of 0.1 g/10 min, a HLMI/MI of 35, and a bulk density of 0.14 g/cm$^3$ was obtained. The catalytic activity corresponded to 2,700 g/g catalyst, the average particle size was 320 μm, the content of fine particles was 6.6% by weight, and σ was 0.37. Further, the density was 0.930 g/cm$^3$.

EXAMPLE 6

Copolymerization of ethylene and 1-butene was carried out by a gas phase method by using 91.5 mg of the catalyst component (A) prepared in Example 3 (containing 8.3 mg of a solid composite). Polymerization was carried out in the same manner as in Example 5 except that the catalyst component (B) was changed. That is, in Example 6, polymerization was carried out by using triisobutylaluminum and diethylaluminum chloride as the catalyst component (B).

As a result, 168 g of polyethylene having a melt index of 0.1 g/10 min, a HLMI/MI of 29, and a bulk density of 0.48 g/cm$^3$ was obtained. The catalytic activity corresponded to 20,200 g/g catalyst, the average particle size was 400 μm, the content of fine particles was 1.2% by weight, and σ was 0.12. Further, the density was 0.927 g/cm$^3$.

EXAMPLE 7

Copolymerization of ethylene and 1-butene was carried out by a gas phase method by using 89.1 mg of the catalyst component (A) prepared in Example 3 (containing 8.1 mg of the solid composite). Polymerization was carried out in the same manner as in Example 5 except that the catalyst component (B) was changed. That is, in Example 7, copolymerization was carried out by using diethylaluminum chloride and diethylaluminum ethoxide as the catalyst component (B).

As a result, 177 g of polyethylene having a melt index of 0.1 g/10 min, a HLMI/MI of 30, and a bulk density of 0.48 g/cm$^3$ was obtained. The catalytic activity corresponded to 21,800 g/g catalyst, the average particle size was 460 μm, the content of fine particles was 0.7% by weight, and σ was 0.13. Further, the density

EXAMPLES 8 TO 12

The preparation of the catalyst component (A) was carried out in the same manner as in Example 3 except that prepolymerization conditions were changed as shown in Table 1. Further, polymerization of ethylene was carried out in the same manner as in Example 2. The results are shown in Table 2.

TABLE 1

| | Prepolymerization conditions | | | | |
|---|---|---|---|---|---|
| | Solid | Electron donative | Absorption | Organometallic compound | |
| | Composite (g) | substance (mmol) | ratio α-olefin (g/g) | Type | Amount (mmol) |
| Example 8 | 3.53 | 2.79 | Propylene 10 | TIBAL | 92.9 |
| Example 9 | 2.70 | 2.13 | Propylene 3 | TEAL | 71.1 |
| Example 10 | 2.65 | — | Ethylene 3 | TIBAL | 69.7 |
| Example 11 | 2.84 | — | Ethylene 3 | TIBAL | 74.7 |
| Example 12 | 2.42 | — | Ethylene 3 Propylene 3 | TIBAL | 63.7 |

TIBAL: Triisobutylaluminum
TEAL: Triethylaluminum

TABLE 2

Results of polymerization of ethylene

|  | Amount of catalyst component (A) (mg) | Yield of polymer (g) | Activity (g/g) | MI (g/10 min) | HLMI/MI | Bulk density (g/cm$^3$) | Content of fine particles (wt %) | Average particle size ($\mu$m) | $\sigma$ |
|---|---|---|---|---|---|---|---|---|---|
| Example 8  | 77.0 | 217 | 31000 | 0.4 | 35 | 0.48 | 0.8 | 540 | 0.15 |
| Example 9  | 80.3 | 208 | 28500 | 0.3 | 24 | 0.47 | 0.8 | 500 | 0.14 |
| Example 10 | 73.7 | 154 | 23000 | 0.3 | 28 | 0.45 | 1.2 | 420 | 0.13 |
| Example 11 | 79.2 | 174 | 24200 | 0.4 | 30 | 0.47 | 0.9 | 450 | 0.11 |
| Example 12 | 75.9 | 175 | 25300 | 0.3 | 29 | 0.48 | 1.0 | 460 | 0.14 |

EXAMPLES 13 TO 20 AND COMPARATIVE EXAMPLES 3 TO 4

The catalyst component (A) was prepared in the same manner as in Example 3 except that the types and amounts of the reactants (iii) and (iv) were changed as shown in Table 3. Further, polymerization of ethylene was carried out in the same manner as in Example 2. The results are shown in Table 4. From these results, it is apparent that particle properties of polyethylene of the present invention are excellent with respect to the bulk density, average particle size and $\sigma$.

TABLE 3

Production of catalyst component (A)

|  | Reactant (iii) | | Reactant (iv) in the first step | | Reactant (iv) in the second step | |
|---|---|---|---|---|---|---|
|  | Type | Amount | Type | Amount | Type | Amount |
| Example 13 | TMS<br>TES | 0.086<br>0.086 | DEAC | 0.023 | MONIBAC | 0.240 |
| Example 14 | TMS<br>TES | 0.086<br>0.086 | EASC | 0.093 | MONIBAC | 0.170 |
| Example 15 | TMS | 0.173 | DEAC<br>MONIBAC | 0.070<br>0.023 | MONIBAC | 0.170 |
| Example 16 | TMS<br>TES | 0.058<br>0.058 | DEAC<br>MONIBAC | 0.070<br>0.023 | MONIBAC | 0.170 |
| Example 17 | TMS<br>DMPS | 0.086<br>0.086 | DEAC<br>MONIBAC | 0.070<br>0.023 | MONIBAC | 0.170 |
| Example 18 | TMS<br>DMPS | 0.086<br>0.086 | EASC | 0.116 | MONIBAC | 0.150 |
| Example 19 | TMS<br>MPPS | 0.086<br>0.086 | DEAC<br>MONIBAC | 0.070<br>0.023 | MONIBAC | 0.170 |
| Example 20 | TMS<br>MPPS | 0.086<br>0.086 | EASC | 0.116 | MONIBAC | 0.170 |
| Comparative Example 3 | — | — | — | — | MONIBAC | 0.260 |
| Comparative Example 4 | — | — | DEAC<br>MONIBAC | 0.070<br>0.023 | MONIBAC | 0.170 |

TMS: Tetramethoxysilane, TES: Tetraethoxysilane
DMPS: Dimethylpolysiloxane, MPPS: Methylphenylpolysiloxane
DEAC: Diethylaluminum chloride
MONIBAC: i-butylaluminum dichloride
EASC: Ethylaluminum sesquichloride
Unit of amount of the reactant to be used: Mol

TABLE 4

Results of polymerization of ethylene

| | Amount of catalyst component (A) (mg) | Yield of polymer (g) | Activity (g/g) | MI (g/10 min) | HLMI/MI | Bulk density (g/cm³) | Content of fine particles (wt %) | Average particle size (μm) | σ |
|---|---|---|---|---|---|---|---|---|---|
| Example 13 | 68.2 | 268 | 43300 | 0.6 | 37 | 0.48 | 0.2 | 400 | 0.12 |
| Example 14 | 74.8 | 248 | 36500 | 1.0 | 29 | 0.49 | 0.3 | 420 | 0.13 |
| Example 15 | 80.3 | 250 | 34200 | 0.8 | 31 | 0.50 | 0.2 | 400 | 0.11 |
| Example 16 | 83.6 | 292 | 38400 | 0.9 | 32 | 0.47 | 0.4 | 440 | 0.12 |
| Example 17 | 74.8 | 216 | 31800 | 0.6 | 31 | 0.48 | 1.2 | 420 | 0.12 |
| Example 18 | 78.1 | 213 | 30000 | 0.7 | 31 | 0.47 | 1.4 | 430 | 0.14 |
| Example 19 | 82.5 | 253 | 33700 | 0.7 | 30 | 0.49 | 0.6 | 440 | 0.14 |
| Example 20 | 93.5 | 294 | 34600 | 0.8 | 31 | 0.47 | 0.7 | 440 | 0.12 |
| Comparative Example 3 | 67.1 | 123 | 20100 | 0.5 | 48 | 0.37 | 10.2 | 360 | 0.45 |
| Comparative Example 4 | 70.4 | 186 | 29000 | 0.5 | 51 | 0.33 | 7.4 | 440 | 0.38 |

COMPARATIVE EXAMPLE 5

As a comparison with Example 4, the solid composite obtained in Example 3 was subjected to pretreatment before the gas phase polymerization. That is, the internal atmosphere of an electromagnetic stirring type autoclave made of stainless steel having an internal volume of 2 l was replaced thoroughly with nitrogen, and a suspension of 5.01 g of the solid composite obtained in Example 3 in 400 ml of hexane was added thereto. Then, while maintaining the internal temperature of the autoclave at 30° C. and the pressure at 1 to 2 kg/cm²G, propylene was supplied, and 15.0 g of propylene was reacted to pretreat the solid composite with propylene, and then gas phase polymerization of ethylene was carried out in the same manner as in Example 2.

As a result, 189 g of polyethylene having a melt index of 0.2 g/10 min, a HLMI/MI of 28, a bulk density of 0.46 g/cm³ was obtained. The catalytic activity corresponded to 21,500 g/g catalyst, the average particle size was 380 μm, the content of fine particles was 2.1% by weight, and σ was 0.11.

COMPARATIVE EXAMPLE 6

The catalyst as disclosed in Japanese Unexamined Patent Publication No. 262802/1985 was subjected to prepolymerization, and gas phase polymerization was carried out. That is, 70 g (0.94 mol) of n-butanol was placed in 1.6 l autoclave equipped with a stirrer, 0.55 g of iodine, 11 g (0.45 mol) of metal magnesium powder and 61 g (0.18 mol) of titanium tetrabutoxide were added thereto, and further 450 ml of hexane was added. Then, the temperature was elevated to 80° C., and stirring was conducted for 1 hour under sealing with nitrogen, while removing the evolved hydrogen gas. Subsequently, the temperature was elevated to 120° C., at which reaction was conducted for 1 hour, to obtain a Mg—Ti solution.

The Mg—Ti solution was added to a flask having an internal volume of 500 ml in an amount of 0.048 mol in terms of Mg. Then, the temperature was elevated to 45° C., and a hexane solution of tri-i-butylaluminum (0.048 mol) was added over 1 hour. After completion of the addition, stirring was conducted at 60° C. for 1 hour. Then, 2.8 ml (0.048 gram atom of silicon) of methylhydropolysiloxane (the viscosity at 25° C. was about 30 centistokes) was added, and the reaction was conducted for 1 hour under reflux. After the mixture was cooled to 45° C., 82 ml (0.63 mol) of a 50% hexane solution of i-butylaluminum dichloride was added over 2 hours. After completion of the addition, stirring was conducted at 70° C. for 1 hour. Hexane was added to the product, and washing was conducted 15 times by decantation, to obtain a slurry of a solid composite suspended in hexane.

The solid composite thus obtained was subjected to prepolymerization in the same manner as in Example 3 to prepare a catalyst component (A), and gas phase polymerization of ethylene was carried out in the same manner as in Example 2.

As a result, 56 g of polyethylene having a melt index of 0.5 g/10 min, a HLMI/MI of 37, and a bulk density of 0.17 g/cm³ was obtained. The catalytic activity corresponded to 8,000 g/g catalyst, the average particle size was 380 μm, the content of fine particles was 6.8% by weight, and σ was 0.41.

What is claimed is:

1. A method for producing a polyolefin in the presence of a catalyst comprising a transition metal compound and an organometallic compound, which comprises polymerizing at least one α-olefin in the presence of a catalyst system comprising:

(A) a solid catalyst component prepared by reacting a homogenous solution consisting of
  (i) at least one member selected from the group consisting of metal magnesium and a hydroxylated organic compound, and oxygen-containing organic compounds of magnesium,
  (ii) at least one oxygen-containing organic compound of titanium and
  (iii) at least one silicon compound, first with
  (iv) at least one first organoaluminum halide compound of the formula:

$$AlR^5_zX_{3-z}$$

wherein $R^5$ is a hydrocarbon group having from 1 to 20 carbon atoms, X is a halogen atom, and $1 \leq z \leq 2$, and wherein the atomic ratio of gram atoms of Al in the component (iv) to gram atoms of Mg in the component (i) (Al/Mg) is from 0.1 to 2.5 to precipitate crystalline nuclei, and then with
  (iv') at least one second organoaluminum halide compound different from (iv) of the formula:

$$AlR^5_zX_{3-z}$$

wherein $R^5$ and X are the same as defined above, and $0<z<2$, and wherein the atomic ratio of gram atoms of Al in the component (iv') to gram atoms of Mg in the component (i) is from 0.5 to 20 to effect growth of the crystalline nuclei precipitated in (iv), adding thereto (v) at least one member selected from the group consisting of organometallic compounds of metals of Groups Ia, IIa, IIb, IIIb, and IVb of the Periodic Table, and (vi) absorbing at least one α-olefin in the reaction product of (i)–(v) in an amount of 0.001 to 20 parts by weight per part by weight of said reaction product of (i)–(v), and (B) an additional amount of at least one member selected from the group consisting of organometallic compounds of metals of Groups Ia, IIa, IIb, IIIb and IVb of the Periodic Table.

2. The method according to claim 1, wherein the reactant (i) is a combination of metal magnesium and at least one hydroxylated organic compound selected from the group consisting of alcohols, organic silanols and phenols.

3. The method according to claim 1, wherein the reactant (i) is at least one member selected from the group consisting of magnesium alkoxides, magnesium alkyl alkoxides, magnesium hydroalkoxides, magnesium phenoxides, magnesium carboxylates, magnesium oxymates, magnesium hydroxamate salts, magnesium hydroxylamine salts, magnesium enolates, magnesium silanolates and complex alkoxides of magnesium with other metals.

4. The method according to claim 1, wherein the reactant (i) is a compound of the formula $[TiO_a(OR^1)_b]_m$ wherein $R^1$ is a hydrocarbon group having from 1 to 20 carbon atoms, a and b are such that $a \geq 0$ and $b>0$ and they are numbers agreeable with the valence of titanium, and m is an integer.

5. The method according to claim 1, wherein the reactant (iii) is a polysiloxane having repeating units of the formula $—(Si(R^2)(R^3)—O—)_p—$ wherein each of $R^2$ and $R^3$ which may be the same or different, is a hydrocarbon group having from 1 to 12 carbon atoms, hydrogen, a halogen, or an alkoxy group, an aryloxy group or a fatty acid residue, having from 1 to 12 carbon atoms, and p is an integer of from 2 to 10,000, provided that $R^2$ and $R^3$ are not simultaneously hydrogen or a halogen.

6. The method according to claim 1, wherein the reactant (iii) is a silane of the formula $H_qSi_rR^4_sX_t$ wherein $R^4$ is a hydrocarbon group having from 1 to 12 carbon atoms, or an alkoxy group, an aryloxy group or a fatty acid residue, having from 1 to 12 carbon atoms, X is a halogen, each of q, s and t is an integer of 0 or more, r is a natural number, and $q+s+t=2r+2$ or $2r$.

7. The method according to claim 1, wherein the reactant (v) is an organometallic compound comprising a metal selected from the group consisting of lithium, magnesium, zinc, tin and aluminum, and a linear or branched alkyl group having from 1 to 20 carbon atoms.

8. The method according to claim 1, wherein the reactant (v) is at least one compound selected from the group consisting of n-butyllithium, diethylmagnesium, diethylzinc, trimethylaluminum, triethylaluminum, tri-i-butylaluminum, tri-n-butylaluminum, tri-n-decylaluminum, tetraethyltin and tetrabutyltin.

9. The method according to claim 1, wherein at least one α-olefin is absorbed in the reaction product of (i)–(v) in an amount of 0.01 to 10 parts by weight per part by weight of said reaction product of (i)–(v).

* * * * *